US005912862A

United States Patent [19]
Gustavsen et al.

[11] Patent Number: 5,912,862
[45] Date of Patent: Jun. 15, 1999

[54] AUTOMATIC DETERMINATION OF SNIPER POSITION FROM A STATIONARY OR MOBILE PLATFORM

[76] Inventors: Arve Gustavsen, Døvikvn. 21, N-3178 Våle; Ragnvald Otterlei, Jørgen Moes Vei 65, N=3600 Kongsberg; Tore Endresen, Spurvestin 1, N-3189 Horten, all of Norway

[21] Appl. No.: 08/981,105

[22] PCT Filed: Sep. 23, 1996

[86] PCT No.: PCT/NO96/00226

§ 371 Date: Dec. 17, 1997

§ 102(e) Date: Dec. 17, 1997

[87] PCT Pub. No.: WO97/14051

PCT Pub. Date: Apr. 17, 1997

[30] Foreign Application Priority Data

Sep. 26, 1995 [NO] Norway ..................................... 953802

[51] Int. Cl.$^6$ ............................. G01S 3/808; G01S 5/20; G01S 11/14
[52] U.S. Cl. ........................... 367/129; 367/124; 367/906
[58] Field of Search .................................... 367/124, 125, 367/129, 906

[56] References Cited

U.S. PATENT DOCUMENTS

| 3,736,553 | 5/1973 | Kermode | 367/129 |
|---|---|---|---|
| 5,070,484 | 12/1991 | Mantel | 367/124 |
| 5,241,518 | 8/1993 | McNelis et al. | 367/127 |

FOREIGN PATENT DOCUMENTS

| 0 684 485 | 11/1995 | European Pat. Off. |
| 2 290 380 | 12/1995 | United Kingdom . |
| 96/07109 | 3/1996 | WIPO . |

*Primary Examiner*—Ian J. Lobo
*Attorney, Agent, or Firm*—Wenderoth, Lind & Ponack, L.L.P.

[57] ABSTRACT

A method is described to determine the position of one or more snipers when a listening station is located in the target area, and when the snipers are randomly located. The intelligent listening system can be located at a stationary or mobile platform, consisting of a minimum of 2 microphones in the combination with a compass. The listening station registers shot sound from the sniper weapon and the shock wave from the projectile trajectory. These two signals are utilized to determine the north adjusted direction to the weapon and the shock wave. The position of the weapon is determined when utilizing the speed of the projectile and the time difference between the shot sound from the weapon and the shock wave. The position is determined as the distance along the direction vector from the listening station and to the sniper weapon. Additionally the closest distance to the trajectory of the projectile is determined. A corresponding requirement can be satisfied in an open battlefield or for general surveillance when the time and the position of gunfire is of interest. Such information can be communicated over telephone or radio.

8 Claims, 1 Drawing Sheet

AUTOMATIC DETERMINATION OF SNIPER POSITION FROM A STATIONARY OR MOBILE PLATFORM

BACKGROUND OF THE INVENTION

1. Field of the Invention

The present invention relates to an automatic method of passively determining sniper positions which are randomly located in the surroundings by utilizing a simple stationary or mobile listening station consisting of an intelligent listening system which comprises two or more microphones together with a compass for supporting the solution.

Such a surveillance method of shooting activity is of the utmost importance during unsafe conditions when snipers are especially active, as it may be during UN operations, and the importance of identifying the position of such activity is vital. The method is meant for stationary as well as for mobile activities. A stationary solution can be useful in areas such as airports, official buildings, military facilities, private buildings, VIPs in governmental administration, and other unsafe areas. The method can be utilized for mobile activities such as being hand held in the battle field, and being mounted on a car when driving in unsafe areas.

Equipment that is utilizing the present invention can be located at areas with shooting activities, and can be mounted on a car that is moved into the area. Remote monitoring by radio satisfies the safe monitoring of the situation when gunfire is registered.

2. Description of Prior Art

Various methods for the detection and positioning of sound sources are conventionally known and these are disclosed, for example, in GB-3,336,245, GB-2,062,864, GB-2,099,995, U.S. Pat. No. 3,838,593 and U.S. Pat. No. 3,626,750, GB-1,349,120, NO-1,39,240, GB-1,174,048, GB-342,800, GB-1,452,788, GB-2,167,556, U.S. Pat. No. 4,372,151, U.S. Pat. No. 4,543,817, WP 82/00718, NO 169678, GB-A,2,181,238, U.S. Pat. No. 4,333,170, EP-A, 64,477, GB-A,2,191,580, U.S. Pat. No. 5,070,484 and U.S. Pat. No. 5,099,455.

A majority of these conventional methods deal with leakage in pipes, and thus they assume that the sound moves through solid material. As a result, these conventional methods distinctly deviate from the present invention. Most methods are oriented towards leakage problems in situations where the positioning can be achieved along one line (one dimensional). The EP-A,64,477, GB-A,2,181,238 and NO 169678 references, on the other hand, are utilized to detect and determine the direction to and the position of acoustic sound through air, they all utilize more than one microphone cluster for such positioning, and they have several microphones in each cluster for that purpose. The EP-A,64,477 and GB-A,2,181,238 references are related to weapons and gunfire. Most of these methods use several intercepting directional vectors with a base in several microphone clusters in order to determine the position of sound origin. The GB-A,2,191,580 reference uses an array of distributed microphones to determine the position of weapons by sound.

BRIEF SUMMARY OF THE INVENTION

The present invention relates to the determination of the position of weapons by utilizing only one cluster with 2 or more microphones.

The position calculations are made for weapons with projectiles that create shock waves along the projectile trajectory. These shock waves are used together with the shot sound to determine the position of the weapon that fired the projectile. Both sound impressions have impulse features that make it possible to distinguish the sound pattern from other existing sound.

None of the above mentioned conventional methods use such a principle for the positioning of a weapon. There are no known means for an automatic determination of a sniper position based upon a stationary or mobile listening station, requiring a compass for a vehicle's angular and speed corrections to the calculations considering also a variable projectile speed in the position calculations.

The present invention provides a tool for minimizing the equipment for determination of sniper positions and facilitates a method for one person to achieve such a determination without the need for any coordination with other persons or with other mobile or fixed mounted listening equipment.

DETAILED DESCRIPTION OF THE INVENTION

Figure 1:
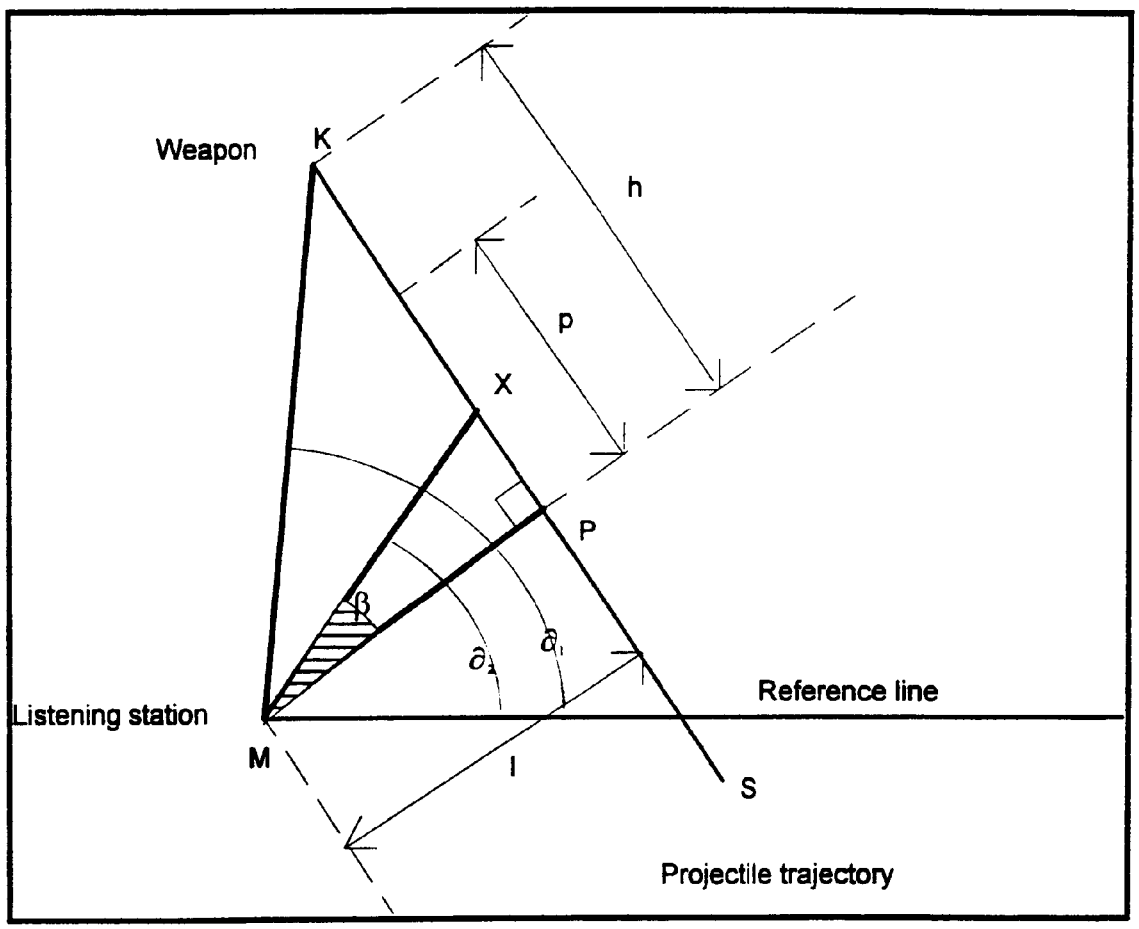
FIG. 1 is a diagrammatic illustration of the method by which the sniper position is determined.

The present invention provides a method for the determination of the position of one or more active weapons when the projectiles from these weapons create shock waves along their trajectories. A listening station with 2 or more microphones in a cluster is required for the implementation of the method. These microphones pick up signals from all available acoustics within the frequency domain of the microphones for acoustic monitoring in the sound measuring system of the listening station. The sound measuring system measures, calculates, and performs the analysis of any existing environmental sound received from the microphones. Amplitude/phase/frequency-data for each microphone is calculated along with a complete and continuous evaluation of the sound impulses received.

A shock wave from a projectile has no pre-warning. This sound is distinctly different from the shot sound as well as any other environmental sound. The direction to the shock wave is determined by a relative phase measurement also together with a time measurement. A 2 or 3 dimensional vector can be calculated, depending only upon the number of microphones involved. A corresponding determination of the direction to the weapon is made when the shot sound reaches the sensor. The projectile follows a trajectory when it leaves the weapon, and this trajectory identifies one side of a triangle in which the two calculated velocity vectors represents the remaining two sides of the triangle. The position of the weapon can be determined along the directional vector with the base in the position of the cluster by taking into consideration the speed of the projectile and the time utilized between the two corners of the triangle.

The afore-mentioned method is general by nature, and does not require any knowledge about the surroundings. The method of the present invention makes it possible to estimate the position of a sniper when the sniper is positioned at a point K and shoots towards point S as shown in FIG. 1. The line (trajectory) K-S has a minimum distance 1 from the cluster M. The point P at the trajectory K-S has a minimum distance from the sensor. Point X is the so called "bang generation point". The following is one example according to the present invention on possible ways of calculating the sniper position:

The speed of the projectile is know as:

$$v=v(t) \quad\quad 1.$$

The distance from the projectile to the closest point P on the trajectory K-S at time t is given by:

$$p = h - \int_0^t v(s)\cdot ds \quad\quad 2.$$

See FIG. 1.

The sound generated by the projectile in a position p reaches the sensor after a time τ, calculated from the point in time when the shot was fired, as follows:

$$\tau = t + \frac{\sqrt{l^2 + \left(h - \int_0^t v(s)\cdot ds\right)^2}}{c} \quad\quad 3.$$

The shock wave reaches the sensor at a time given by the minimum of the above function. A corresponding value for t is $t_{min}$. This value is found by solving the following equation:

$$\left(h - \int_0^{t_{min}} v(s)\cdot ds\right) = \frac{l}{\sqrt{\left(\frac{v(t_{min})}{c}\right)^2 - 1}} \quad\quad 4.$$

This leads to the equation:

$$\tau_{min} = t_{min} + \frac{\sqrt{l^2 + \left(h - \int_0^{t_{min}} v(s)\cdot ds\right)^2}}{c} \quad\quad 5.$$

At a time $t_{min}$, the projectile was in the position X on the trajectory K-S. The position X is identified on the trajectory at a distance given by the angle β in relation to point P perpendicular from the sensor to the trajectory.

The angle β is defined as follows:

$$\tan(\beta) = \frac{1}{\sqrt{\left(\frac{v(t_{min})}{c}\right)^2 - 1}} \quad\quad 6.$$

This gives further as follows:

$$\sin(\beta) = \frac{v(t_{min})}{c} \quad\quad 7.$$

The listening station is recording the shot sound from the weapon as well as the shock wave from the passing projectile. With the basis in a reference line as shown in FIG. 1, the angles to the two sound impressions are measured as correspondingly angle $\partial_1$ and angle $\partial_2$ relative to the reference line.

The distance h is thereafter calculated as the distance between the position K and P as follows:

$$h = l\cdot\tan(\partial_1 - \partial_2 + \beta) \quad\quad 8.$$

The shot sound reaches the sensor at a time $\tau_n$:

$$\tau_n = \frac{\sqrt{h^2 + l^2}}{c} \quad\quad 9.$$

And it follows that:

$$\Delta\tau = \tau_n - \tau_{min} \quad\quad 10.$$

By means of the above equations, h and l can be determined numerically, and principally this is made by finding the solutions of the following equations:

$$\partial_1 - \partial_2 = \arctan\left(\frac{h}{l}\right) - \beta(h, l) + \sigma_1 \quad\quad 11.$$

$$\Delta\tau = \frac{\sqrt{h^2 + l^2}}{c} - \tau_{min}(h, l) + \sigma_2 \quad\quad 12.$$

Thus, the method according to the present invention provides an accuracy estimate for the distance h and l, while $\sigma_1$, and $\sigma_2$, represents the measuring error for the measurements $\partial_1-\partial_2$ and $\Delta\tau$. The position calculations can be made when the listening station is stationary or is transported with a person or mounted on a moving vehicle. A compass is utilized in order to compensate for north corrections in the angular calculations.

A feature of the present invention is that counter mechanisms enable the calculation of shots, starting at any time. Such a calculation can be made for all weapons for whom positions are calculated as well as for those that have no related shock wave. The listening station is equipped with a compass which is utilized to correct the north orientation of any angular calculation.

Another feature of the present invention is that the listening station can be connected to a presentation unit, thereby providing the operator with available data for the various weapons being active in the area.

A central feature of the invention is that the operator can have presented to him the position of the firing weapons, and the time for such firing.

Another feature of the present invention is that the listening station includes automatic and continuous calibration of microphone characteristics. This is achieved by locating one or more sound generators in known positions within the reach of the listening station. This is a quality assurance for the detection and angular capabilities.

Another feature of the present invention is that the listening station is self sufficient regarding power, thereby simplifying transportation and installation in an emergency.

A feature of the present invention is that the listening station can be connected to a separate alarm and warning system reached by radio or telephone.

What is claimed is:

1. A method for a passive and automatic determination of a position of one or more sniper weapons in active use from one or more geographical positions, wherein the sniper weapons utilize projectiles that create a characteristic shock wave from a passing projectile and a characteristic shot sound from the sniper weapons when the projectiles leave the sniper weapons, said method comprising:

providing a stationary or mobile listening station comprising an intelligent sound measuring system attached to a set of at least two microphones being spaced by predetermined distances, and a compass, wherein sound signals from the microphones are continuously treated in a time domain, frequency domain, or a combination thereof;

locating the listening station within a target area of at least one of sniper weapons;

measuring sound signals generated from the active use of the sniper weapon within a line of sight and reach of the listening station through air;

detecting a time of arrival at the listening station for both the shock wave and the shot sound;

calculating a time difference between the time of arrival at the listening station for the shock wave and the time of arrival at the listening station for the shot sound;

calculating a direction to both the shock wave and the shot sound by utilizing phase measurements, time/amplitude measurements, and cross correlations of the sound signals independently or in combination from the microphones;

adjusting the direction to both the shock wave and shot sound by using north adjustment through the use of the compass;

measuring or obtaining the speed of the projectile; and determining the position of the sniper weapon, measured along the north adjusted direction from the listening station to the sniper weapon, by utilizing the speed of the projectile, the calculated time difference, and the calculated direction to both the shock wave and the shot sound.

2. A method as claimed in claim 1, wherein the listening station counts and registers a number of detected shots for at least one direction and position.

3. A method as claimed in claim 1, wherein the listening station is connected to a display for a presentation of weapon characteristics.

4. A method as claimed in claim 1, wherein the listening station provides an operator with a direction to and a position from where shots are being made, and a time for each shooting.

5. A method as claimed in claim 1, wherein at least one sound generator is located in a known position for an automatic calibration of characteristics of the microphones in the listening station.

6. A method as claimed in claim 1, wherein the listening station is self sufficient such that it can be readily relocated.

7. A method as claimed in claim 1, wherein the listening station can be connected to an alarm and warning function.

8. A method as claimed in claim 1, wherein the listening station can be connected to a communication unit for a transmission of weapon characteristics.

* * * * *